UNITED STATES PATENT OFFICE.

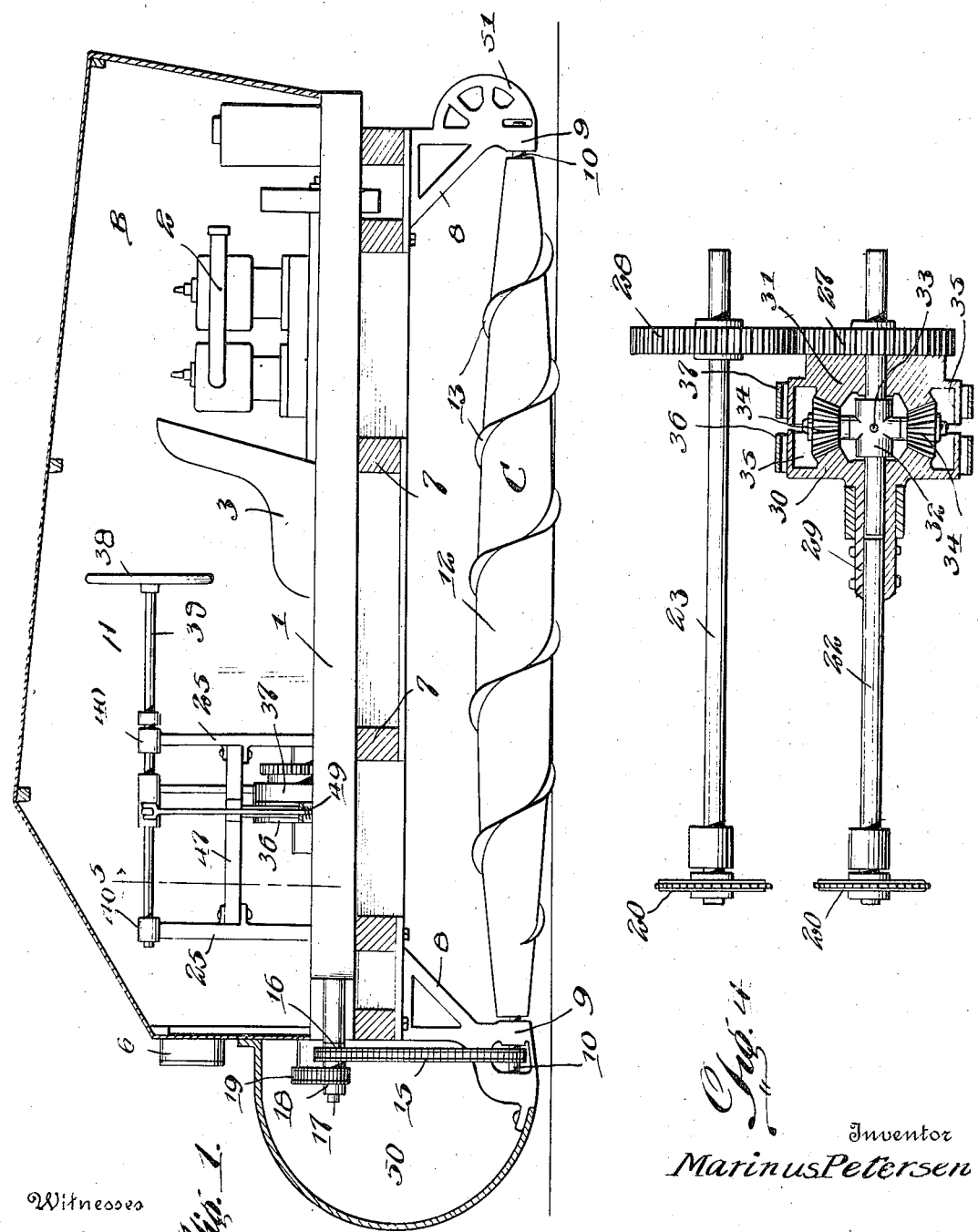

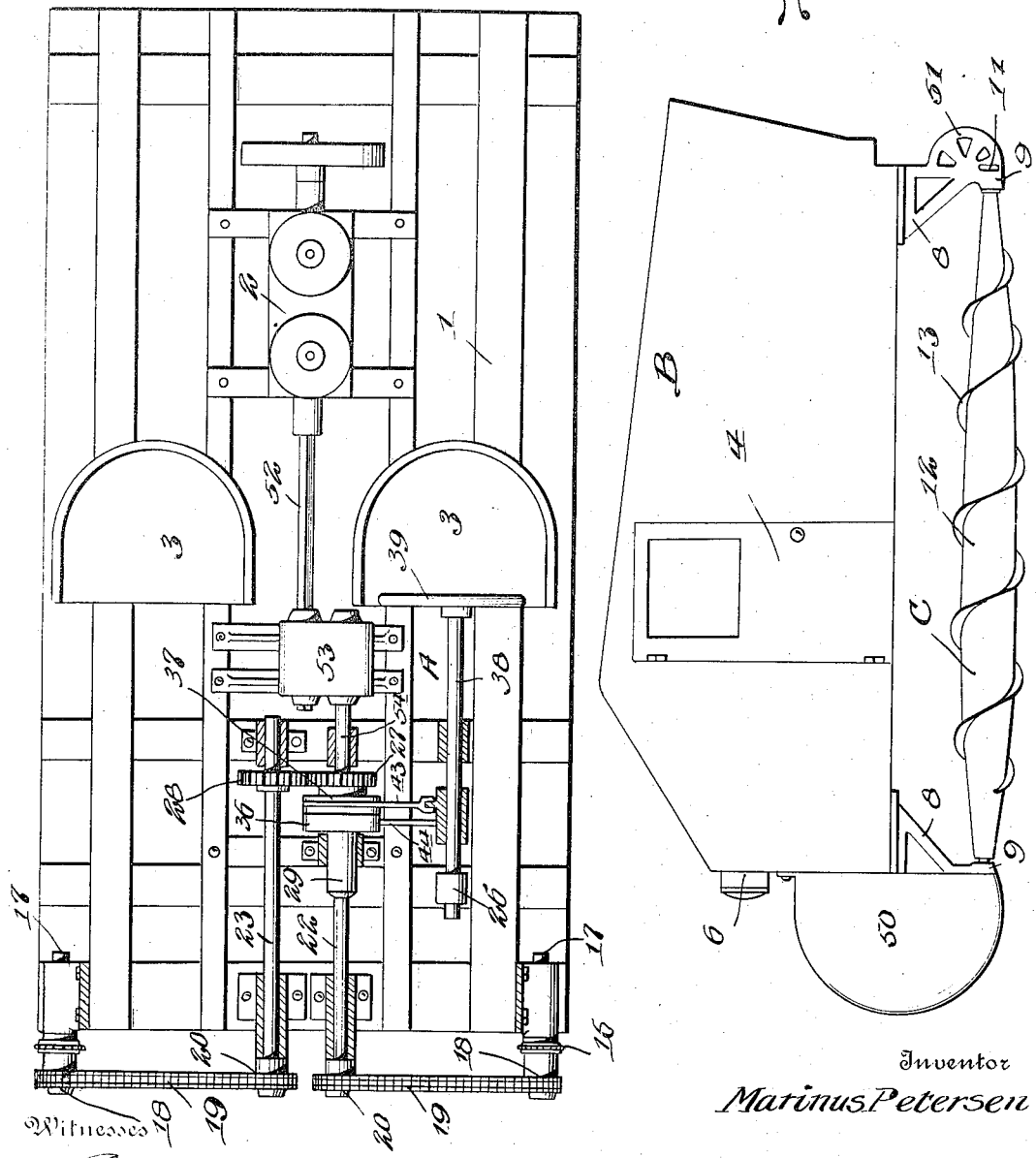

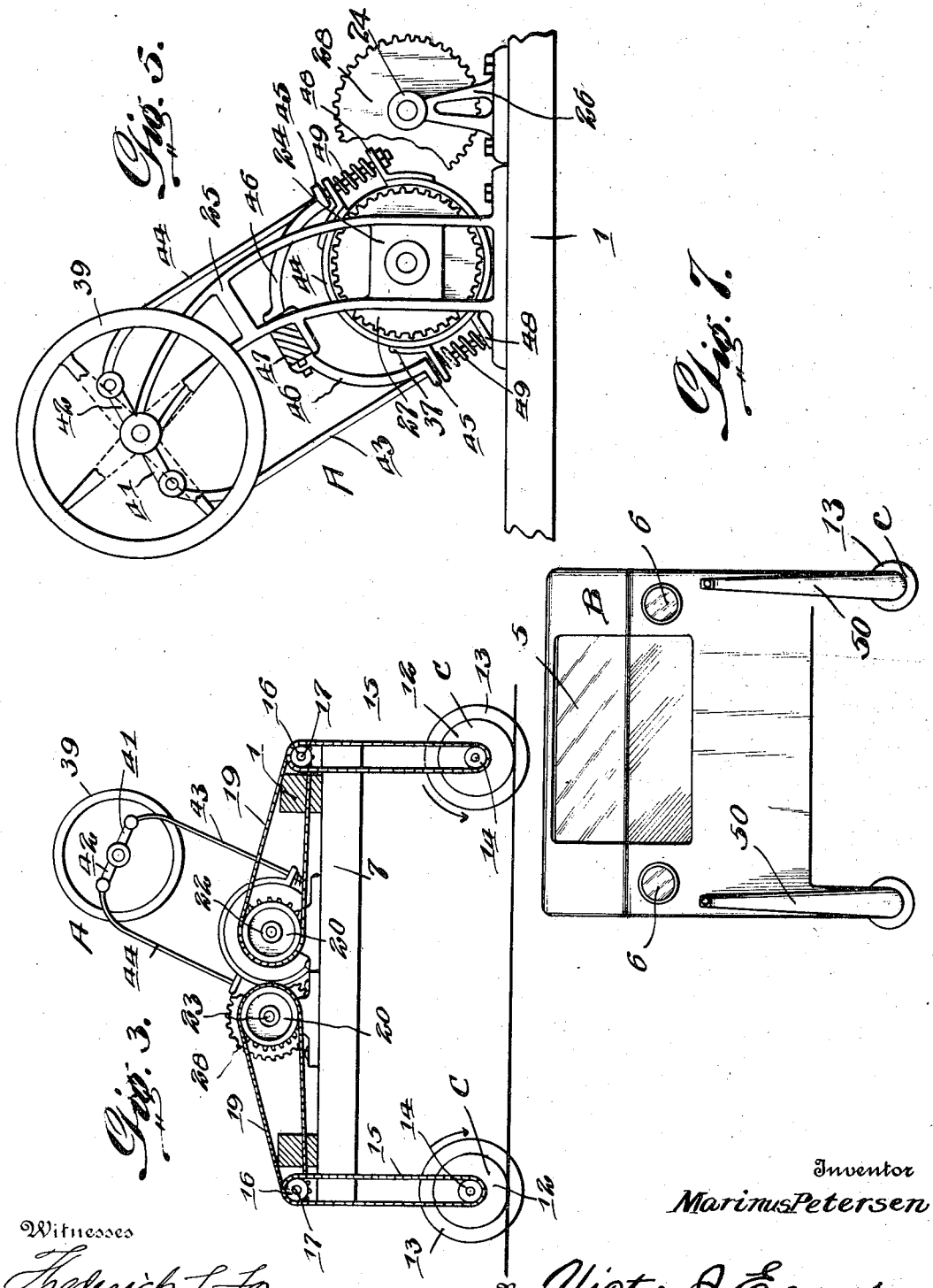

MARINUS PETERSEN, OF NORMA, NORTH DAKOTA.

MOTOR-SLEIGH.

1,211,345. Specification of Letters Patent. Patented Jan. 2, 1917.

Application filed July 1, 1916. Serial No. 107,128.

*To all whom it may concern:*

Be it known that I, MARINUS PETERSEN, a citizen of the United States, residing at Norma, in the county of Renville and State of North Dakota, have invented new and useful Improvements in Motor-Sleighs, of which the following is a specification.

This invention relates to motor sleighs, the object of the invention being to provide in connection with a suitable frame, combined propellers and runners, and driving and steering mechanism used in conjunction with said propellers and runners, whereby the latter may be driven at equal or uniform speed and also at different speeds so that the sleigh may be steered as well as driven by said propellers and runners, the entire mechanism being under the control of the operator in his seat on the frame or platform of the machine.

With the above and other objects in view, the invention consists in the novel construction, combination and arrangement of parts, as herein described, illustrated and claimed.

In the accompanying drawings: Figure 1 is a vertical longitudinal section through a motor sleigh embodying the present invention, certain parts being shown in elevation. Fig. 2 is a plan view of the same partly in section, the body and certain portions of the superstructure being omitted. Fig. 3 is a front diagrammatic view illustrating the propeller driving mechanism. Fig. 4 is a fragmentary horizontal section showing the parallel driving shafts, the differential gearing, certain parts being shown in elevation. Fig. 5 is an enlarged fragmentary section on the line 5—5 of Fig. 1. Fig. 6 is a side elevation of the complete sleigh. Fig. 7 is a front elevation of the same.

The motor sleigh in the preferred embodiment thereof comprises a frame or platform 1 upon which is supported a motor conventionally shown at 2, seats 3, and the steering control mechanism designated generally at A.

B generally designates a top or cover which extends upwardly from and is supported by the platform or frame, the same being provided with one or more doors 4 and a transparent windshield 5 at opposite sides of which are arranged headlamps 6.

Extending under the platform 1 are cross bars 7 which give increased strength to the body and frame of the machine and also form means to which are fastened front and rear hangers 8 having bearings 9 for the front and rear shaft portions 10 and 11 of a plurality of combined propellers and runners each of which is designated generally at C.

Each propeller C comprises a hollow or tubular cigar-shaped body 12 which is of the greatest diameter at the center and which tapers in both directions therefrom toward the opposite extremities, said body 12 being surrounded by a spiral propelling flight 13 which extends to points adjacent to the opposite extremities of said body 12. Two of said combined propellers and runners are preferably employed arranged in parallel relation to each other and at opposite sides of the center of the machine, each of said propellers being provided at one end, preferably the front end, with a sprocket wheel 14 from which a chain 15 extends upwardly around a sprocket wheel 16 on a shaft 17 which also has fast thereon another sprocket 18. From each of the sprocket wheels 18, a chain 19 extends inwardly around another sprocket wheel 20 fast on one of a pair of parallel shafts 22 and 23 journaled in bearings 24 (see Fig. 5) one of which is preferably formed integrally with a bearing post 25 for the shaft of the steering wheel and the other of which is formed in a bracket 26 fastened to the platform frame and extending upwardly therefrom, the shafts 22 and 23 being arranged in the same horizontal plane.

The shafts 22 and 23 are geared together to rotate in opposite directions by means of the gears 27 and 28 which mesh with each other as shown in Figs. 2 and 4. The gear 28 is fast on the shaft 23, as is also one of the sprocket wheels 20. The other shaft 22 is divided or sectional, the gear 27 being loose on the rear end portion thereof and the forward section of said shaft having fastened thereto by means of a hub sleeve 29, one of the gears 30 of differential gearing illustrated in Fig. 4. Another gear 31 of the differential gearing has a fixed relation to the gear 27. Between the gears 30 and 31 there is interposed a pinion carrier 32 fast on the rear section of the shaft 22, the same being shown as connected with said shaft by a pin 33. Pinions 34 are journaled on the carrier 32 and mesh with the gears 30 and 31. The arrangement of differential gearing thus far described is similar to that used in automobile practice.

Each of the gears 30 and 31 is provided with a friction drum face 35 and said faces are surrounded by straps 36 and 37 adapted to be independently operated for a purpose which will hereinafter appear.

38 represents a hand steering wheel which is fast on a steering shaft 39 journaled in bearings 40 at the upper extremities of a pair of bearing posts 25 one of which is illustrated in front elevation in Fig. 5. The shaft 39 has two arms 41 and 42 extending in opposite directions therefrom as best shown in Fig. 5, the arm 41 having pivotally connected thereto a clutch rod 43 and the arm 42 having pivotally connected thereto a clutch rod 44. The clutch 43 connects with the clutch band 37 while the rod 44 connects with the clutch band 36 or vice versa as may be desired by the manufacturer. Each band 36 and 37 is provided at a suitable point with a projecting member 45 which bears against or is secured to one of a pair of clutch band supporting arms 46, the latter being fastened to a stringer or supporting bar 47 in turn secured at its opposite ends to the bearing posts 25 as shown in Fig. 1. The posts 25 are preferably curved or deflected laterally toward the top as best shown in Fig. 5 in order that the steering hand wheel 38 may be located directly in front of one of the seats 3. Each of the bands 36 and 37 is provided at the front end thereof with a projection 48 through which the lower end portion of one of the clutch rods 43 and 44 passes. Coiled expansion springs 49 surround the rods 43 and 44 and are interposed between the projections 45 and 48, their function being to open or expand the clutch bands 36 and 37 to release the respective gears 30 and 31 of the differential gearing.

At the front of the machine, in connection with each of the chains 15, I employ a stationary runner head and hood or housing 50 which is of arcuate or substantially semi-circular shape, the same inclosing and protecting the adjacent chain 15 while at the same time serving as a head portion of the runner to enable the sleigh to surmount obstructions or raised portions of the road surface thus insuring the proper gripping action of the combined propellers and runners on said road surface. Similarly shaped but smaller stationary runner heads 51 are located at the rear ends of the propellers and are preferably formed as integral extensions of the rear hangers 8, the heads 51 being useful in propelling the sleigh in a rearward direction.

The engine shaft 52 extends into the casing 53 of transmission gearing which is preferably of the well known sliding gear type. The driving shaft 54 extending rearwardly from the transmission casing 53 is connected directly to the rear end section of the shaft 22 hereinabove described. Any suitable gear shifting means may be employed similar to that used in automobile practice, the gear shifting means not being shown.

From the foregoing description, taken in connection with the accompanying drawings, it will now be understood that the rear section of the shaft 22 is continuously driven by the motor 2 as long as the latter is in operation. As the shafts 22 and 23 are geared together in the manner described and shown, under ordinary circumstances they revolve at the same speed in opposite directions, motion being imparted to the combined propellers and runners C by means of the sprocket driving mechanism best illustrated in Fig. 3. When the operator desires to turn to the right or to the left, he gives a partial turning movement to the hand wheel 38 causing one of the clutch bands 36 and 37 to close around the drum face 35 of one of the gears 30 and 31 so as to resist the turning movement of said gear. This either slows down or stops one of the shafts 22 and 23 so that the power of the engine is delivered to the other one of said shafts. By turning the wheel 38 in one direction, one of the bands 36 is brought into use and by turning said wheel in the opposite direction, the other band is brought into use. In this way one of the combined propellers and runners acts to hold back that side of the machine while the other propeller operates at full speed and serves to turn the machine in the direction desired by the operator and in accordance with the direction in which the hand wheel 38 is turned.

I claim:—

1. In a motor sleigh, the combination of a frame, combined rotary propellers and runners extending in a fore and aft direction beneath said frame and having their axes substantially parallel, parallel driving shafts supported by said frame, driving connections between said driving shafts and said propellers and runners, gears connecting said driving shafts for actuating the same simultaneously in opposite directions, one of said driving shafts being sectional, differential gearing connecting the sections of the last named shaft, clutch faces on two opposing members of said differential gearing, independently operable clutch bands encircling said clutch faces, a hand steering wheel, and connections between said wheel and clutch bands, whereby the latter may be independently operated, one by turning the hand wheel in one direction and the other by turning the hand wheel in the opposite direction.

2. In a motor sleigh, the combination of a frame, combined rotary propellers and runners extending in a fore and aft direction beneath said frame and having their axes substantially parallel, parallel driving shafts supported by said frame, driving connections between said driving shafts and said propellers and runners, gears connecting said driving shafts for actuating the same simultaneously in opposite directions, one of said driving shafts being sectional, differential gearing connecting the sections of the last named shaft, clutch faces on two opposing members of said differential gearing, independently operable clutch bands encircling said clutch faces, a hand steering wheel, connections between said wheel and clutch bands, whereby the latter may be independently operated, one by turning the hand wheel in one direction and the other by turning the hand wheel in the opposite direction, and clutch band releasing means.

3. In a motor sleigh, the combination of a frame, combined rotary propellers and runners extending in a fore and aft direction beneath said frame and having their axes substantially parallel, parallel driving shafts supported by said frame, driving connections between said driving shafts and said propellers and runners, gears connecting said driving shafts for actuating the same simultaneously in opposite directions, one of said driving shafts being sectional, differential gearing connecting the sections of the last named shaft, clutch faces on two opposing members of said differential gearing, independently operable clutch bands encircling said clutch faces, a hand steering wheel, connections between said wheel and clutch bands, whereby the latter may be independently operated, one by turning the hand wheel in one direction and the other by turning the hand wheel in the opposite direction, a motor mounted on said frame, and variable speed transmission gearing interposed between the said motor and the driving shaft with which the differential gearing is associated.

In testimony whereof I affix my signature.

MARINUS PETERSEN.